June 1, 1948. L. E. R. BARLOW 2,442,580
VEHICLE ILLUMINATOR
Filed Aug. 10, 1945
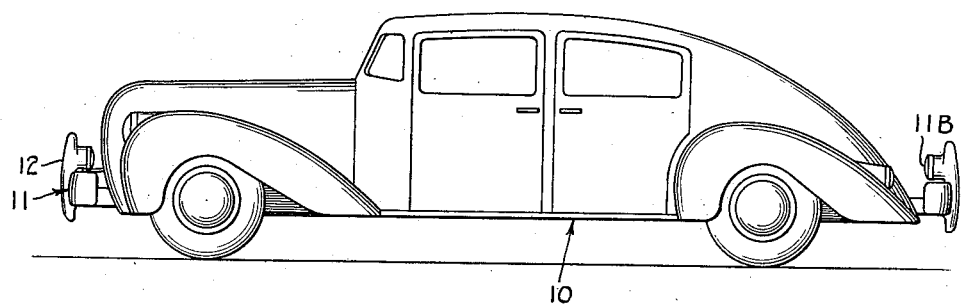
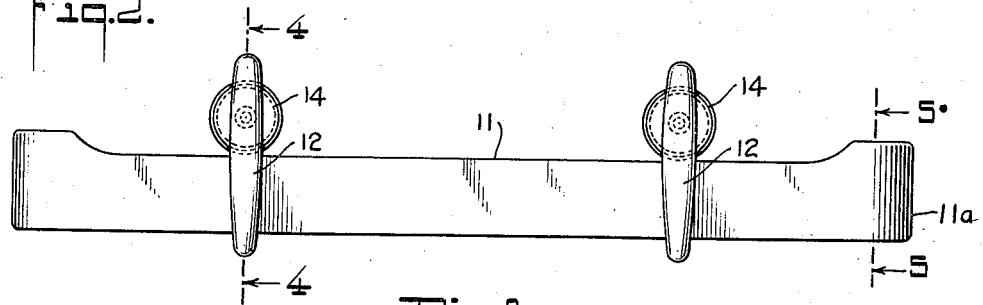
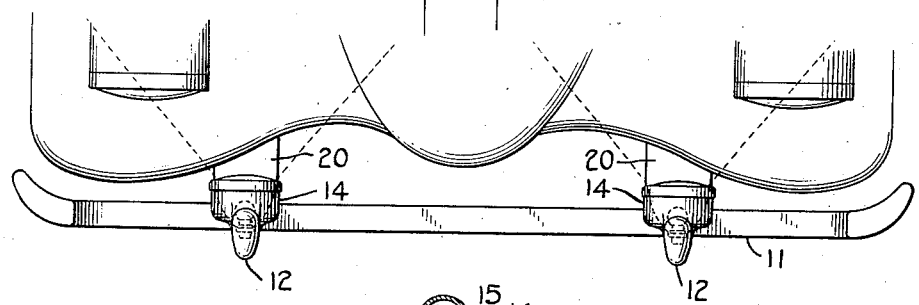
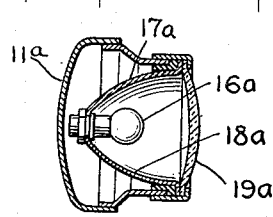
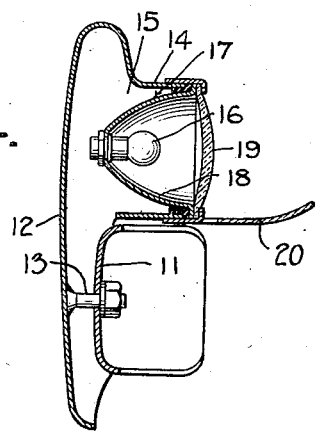
INVENTOR
L.E.R. Barlow
BY H.H. Golden
ATTORNEY Patented June 1, 1948

2,442,580

UNITED STATES PATENT OFFICE 2,442,580

VEHICLE ILLUMINATOR

Lillian Eden Rawlins Barlow, New York, N. Y.

Application August 10, 1945, Serial No. 610,063

2 Claims. (Cl. 240—7.1)

This invention relates to means for illuminating parts of an automobile so that the automobile may be rendered more visible to drivers approaching it.

As a feature of my invention, I have arranged for the mounting of suitable illuminating lights on the bumper of an automobile in a position to direct the rays toward the automobile while effectively shielding the lights and preventing their interfering with the driver's vision. The lights are further shielded and protected by the bumper. In effect, the bumper thus acts as a lamp support while protecting the lamps and shielding the light rays emanating therefrom.

I have thus outlined the more important features of my invention in order that my contribution to the art may be better understood, and in order that the relation of my contribution to the prior art may be better comprehended.

Referring now to the drawings, Fig. 1 is an elevation of a typical automobile showing my invention applied thereto. Fig. 2 is an elevation of the bumper attached to the front end of the automobile shown in Fig. 1. Fig. 3 is a plan view of the front end of the automobile shown in Fig. 4. Fig. 4 is a section taken along lines 4—4 of Fig. 2. Fig. 5 is a view of a modification taken of a modified bumper along section lines positioned as are lines 5—5 of Fig. 2.

Referring now more particularly to the drawings, reference numeral 10 indicates a typical automobile having secured at its front end a bumper 11. As best seen in Figs. 2 and 4, the bumper 11 has fastened thereto a pair of bumper guards 12, each bumper guard being bolted to the bumper as indicated at 13. Each bumper guard 12 has a portion 14 that is preferably hollow to form a chamber designated by reference numeral 15 in Fig. 4.

A lamp bulb 16 is carried by a lamp housing or lamp support 17 that is mounted within the chamber 14. Where the usual type of lamp bulb 16 is utilized, as distinguished from the type having an integral reflector, the lamp support 17 is formed with a reflector surface 18 and carries a lens 19. It is obvious that the light rays will be directed rearwardly from the bumper toward the front end of the automobile at a level considerably below that of the eyes of the operator within the automobile. Therefore, the light rays will not interfere with the driving of the vehicle but will illuminate the automobile so that it will be readily seen by pedestrians. Moreover, the lamps will be well shielded as is quite apparent, and will be well protected against injury.

A suitable deflector 20 is preferably secured to the bumper guard in the position indicated in Fig. 4 whereby to prevent dirt and water from splashing upwardly against lens 19 when the automobile is in motion.

In Fig. 5, I show a modified form of the invention in which one of the enlarged ends 11a of a bumper similar to bumper 11 is shown supporting a lamp housing 17a in which is mounted an electric light bulb 16a whose rays are directed by a reflector surface 18a through a lens 19a toward the automobile. Naturally, there may be a lamp housing at each end of the bumper so as to illuminate both sides of the automobile. Those skilled in the art will appreciate further that one pair of lamps will generally suffice, and that this pair of lamps may be mounted within bumper guards such as shown by me, or at the enlarged ends of the bumper. It will be well to indicate also that lamps may be mounted on the rear bumper of the automobile as indicated by reference numeral 11b in Fig. 1, the construction of the rear bumper and lamps being the same as the front bumper.

I now claim:

1. In combination, an automobile bumper, a pair of vertical bumper guards secured to said bumper, lamp housings formed as integral parts of said vertical bumper guards with the illuminating ends of said lamp housings facing toward the automobile, the bumper guards being each so formed as to present a solid metal bumper surface to the front thereof whereby to protect said lamp housings while shielding the direct light rays from said lamps so that said rays are not visible from a position longitudinally spaced from the automobile and said bumper, and deflectors positioned below said lamp housings to prevent the splashing thereof.

2. In combination, an automobile bumper, a pair of vertical bumper guards secured to said bumper and having chambers formed therein and open to the rear thereof, lamp housings, means formed as integral parts of said vertical bumper guards securing said lamp housings in said chambers with the illuminating ends of said lamp housings facing toward the automobile through the open ends of said chambers, and the bumper guards being each so formed as to present a solid metal bumper surface to the front thereof whereby to protect said lamp housings while shielding the direct light rays from said lamps so that said rays are not visible from a position longitudinally spaced from the automobile and said bumper.

L. EDEN RAWLINS BARLOW.

REFERENCES CITED

The following references are of record in the file of this patent:

UNITED STATES PATENTS

| Number | Name | Date |
|---|---|---|
| 1,201,942 | Curtis | Oct. 17, 1916 |
| 1,507,702 | Harris | Sept. 9, 1924 |
| 1,771,319 | Schmidt | July 22, 1930 |
| 1,818,126 | Germain | Aug. 11, 1931 |
| 2,177,968 | Weiss | Oct. 31, 1939 |
| 2,231,312 | Ache | Feb. 11, 1941 |